W. FRITZ.
CLUTCH.
APPLICATION FILED JUNE 14, 1918.
1,351,240.
Patented Aug. 31, 1920.
2 SHEETS—SHEET 1.
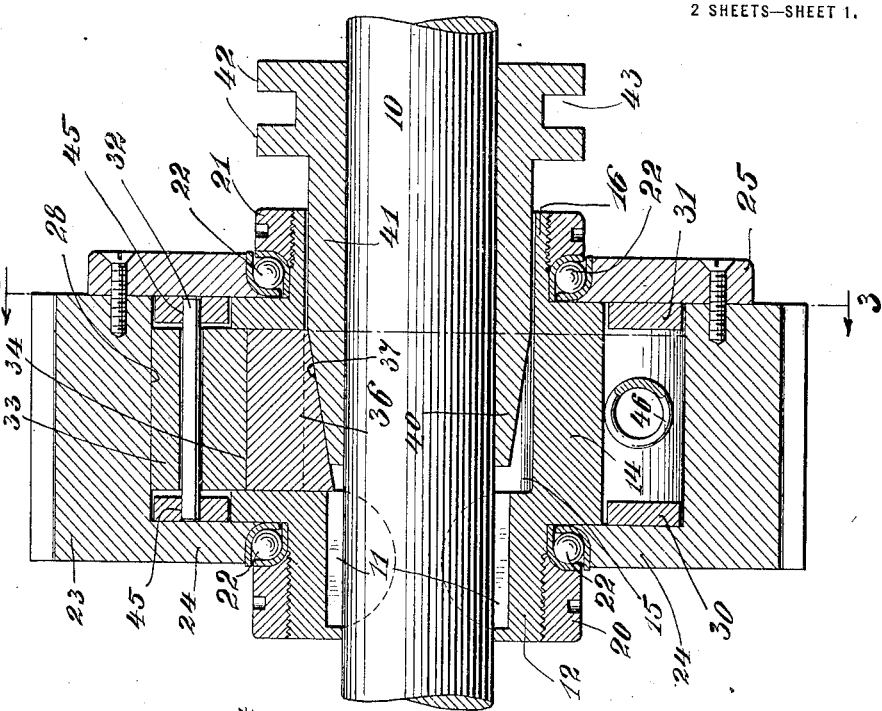
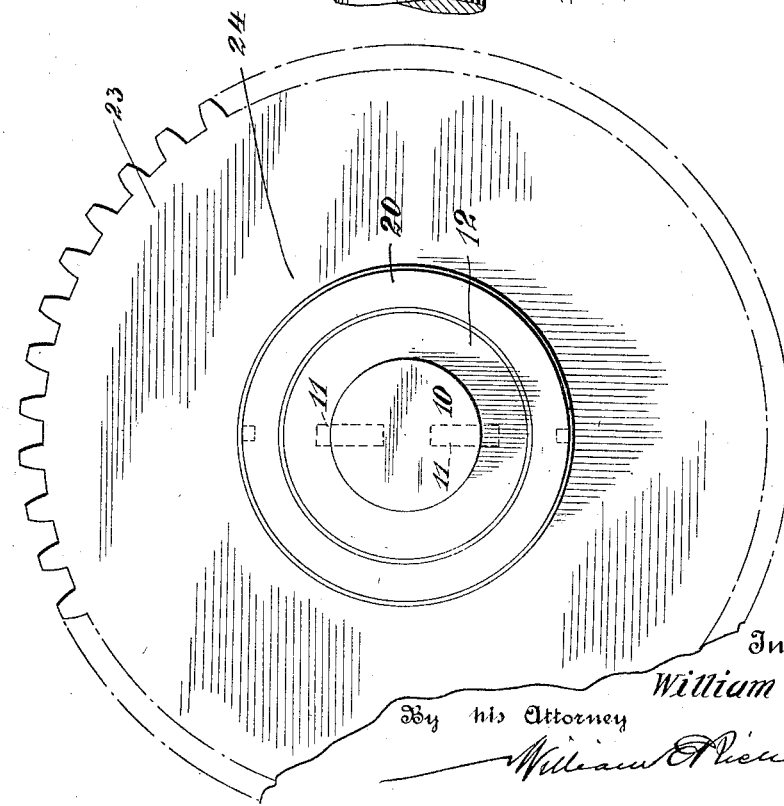
Inventor
William Fritz
By his Attorney W. FRITZ.
CLUTCH.
APPLICATION FILED JUNE 14, 1918.
1,351,240.
Patented Aug. 31, 1920.
2 SHEETS—SHEET 2.
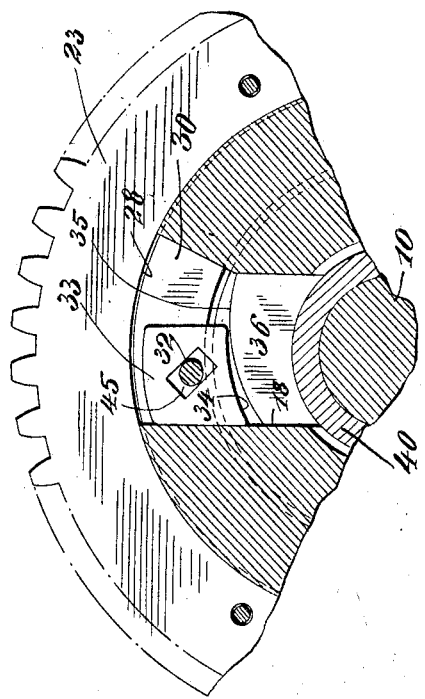
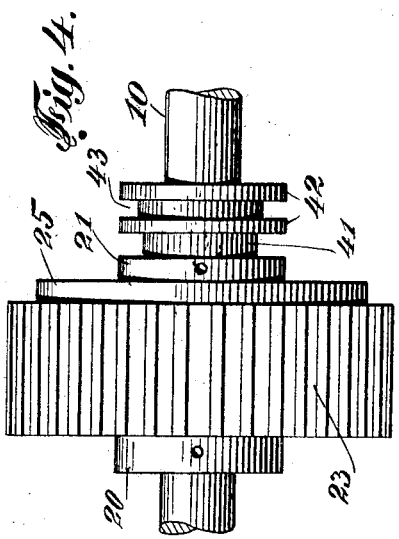
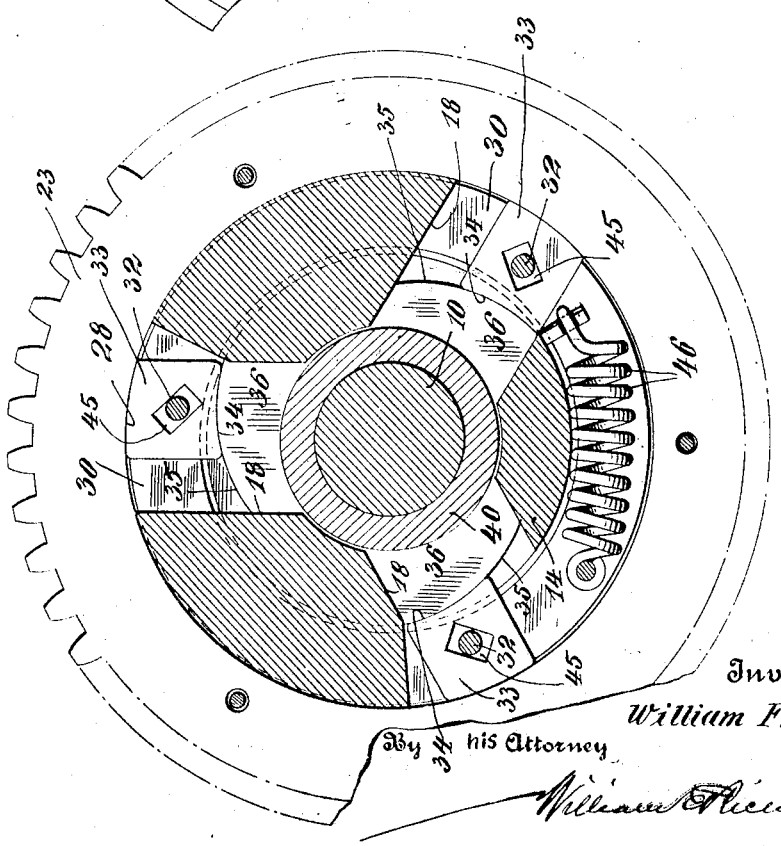
Inventor
William Fritz
By his Attorney

UNITED STATES PATENT OFFICE.

WILLIAM FRITZ, OF PHILADELPHIA, PENNSYLVANIA.

CLUTCH.

1,351,240.  Specification of Letters Patent.  Patented Aug. 31, 1920.

Application filed June 14, 1918. Serial No. 240,053.

*To all whom it may concern:*

Be it known that I, WILLIAM FRITZ, a citizen of the United States, residing at Philadelphia, county of Philadelphia, and State of Pennsylvania, have invented certain new and useful Improvements in Clutches, of which the following is a specification.

This invention relates to improvements in friction clutches of the types used in conveying power from a rotating shaft to a gear, pulley or the like arranged circumjacently thereto.

The principal object of the invention is to provide a clutch which is capable of transmitting substantially the full power of the driving shaft to the driven element without shock, jar or noise and in an easily operated manner.

A further object is to provide means whereby the several contacting shoes are simultaneously and automatically withdrawn from operative contact when the clutch is in a free or inoperative condition.

A still further object is to provide a compact clutch comprised of few and simple parts, all of which are readily produced by ordinary mechanical processes, and which are of great strength and durability.

These and other like objects are attained by the novel construction and combinations of parts hereinafter described, and shown in the accompanying drawing, forming a material part of this disclosure, and in which:—

Figure 1 is an end view showing a clutch made in accordance with the invention;

Fig. 2 is a central longitudinal view of the same;

Fig. 3 is a transverse sectional view taken on line 3—3 of Fig. 2;

Fig. 4 is a side elevational view of the clutch; and

Fig. 5 is a partial transverse sectional view, similar to Fig. 3, but showing the parts in another position.

In the drawings the numeral 10 designates the driving shaft, to which is secured, by means of keys 11, the hub 12 of an annular sleeve 14, containing an interior annular recess 15 and having a ring like extension 16 projecting outward opposite the hub 12, with which it corresponds in exterior diameter.

The sleeve 14 has formed in it a plurality of radial recesses 18, three being shown in the drawing for purposes farther on described.

The exteriors of the hub 12 and ring 16 are both screw threaded and have fitted to them annular cups, respectively 20 and 21, containing seats for the balls 22 which support the gear 23, one side of which has a flange 24 cupped and suited to engage with the balls carried in the cup 20.

Attached to the opposite side of the gear 23 is an annular plate 25, its inner periphery being suited to the balls carried in the cup 21, the arrangement being such that the gear body is free to rotate with respect to the sleeve 14, and yet be held laterally by it.

Formed in the gear body 23 is a concentric annular recess 28 to which are loosely fitted flat plate rings 30 and 31, the latter being next the plate 25. These rings are connected by rigid pins 32 so as to operate simultaneously.

Friction shoes or wedges 33 are fitted to the recess 28, the wedges having a beveled inner face 34 contactable with the outer, similarly beveled ends 35, of blocks 36, slidably carried in the radial recesses 18 of the sleeve.

The inner ends 37 of these sliding blocks are beveled concavely to agree with the cone 40, slidable on the shaft 10, the cone having a cylindrical portion 41 next its hub 42, which is enlarged in diameter and formed with an annular recess 43 suited to receive the fork (not shown) of an operating lever by means of which the cone is moved upon the shaft and when forced forward caused to make contact with the inner ends of the blocks 36, forcing them outward against the friction shoes 33 which in turn impinge against the interior of the annular recess 28, imparting motions to the gear, which is thus locked to the rotating sleeve.

The pins 32 pass through openings 45 in the shoes 33 so that as the latter are moved, the rings 30 and 31 are caused to slightly rotate in their seats, and in order to retract the shoes, when the cone 40 is moved outward or retracted, there is secured to the rings, one end of a coiled tension spring 46, the other end being fixed within the recess 28 to the body 14, so that the clutch, when the cone is withdrawn, is held inoperative by reason of the shoes being retracted.

From the foregoing it will be seen that a simple but effective form of friction clutch has been disclosed in which the driven element is perfectly free from the driver when the cone is retracted, and it will be obvious that either the gear or shaft may be the driver without change in the parts or manner of operation. It will be further apparent that by making the cone double ended two of the clutch elements may be operated in a very convenient manner, for such purposes as transmission gearing for automobiles and other like purposes.

Having thus described my invention and set forth the manner of its application and use, what I claim as new, and desire to secure by Letters Patent, is:

1. In a clutch, a hub adapted to be fixed upon a shaft, said hub being formed with a plurality of radial slots, a member surrounding said hub, shoes disposed in said radial slots and adapted to bear outwardly on the said member, wedge blocks located under the said shoes in the said slots, means for forcing said wedge blocks outwardly, and a common spring operated means for retracting each of said shoes when the first mentioned means is withdrawn.

2. In a clutch, a hub adapted to be fixed upon a shaft, said hub being radially slotted, a member surrounding said hub, shoes disposed in said radial slots and adapted to bear outwardly on the said member, said shoes being formed with diagonal slots and having their inner faces inclined, wedge blocks located in the said slots under the said shoes, said wedge blocks having their outer faces inclined in correspondence to the inner faces of the said shoes, a cone slidable on the shaft adapted to force said wedge blocks outwardly, and means for retracting said shoes when the cone is withdrawn.

3. In a clutch, a hub adapted to be fixed upon a shaft, said hub being radially slotted, a member surrounding said hub, shoes disposed in said radial slots and adapted to bear outwardly on the said member, said shoes being formed with diagonal slots and having their inner faces inclined, wedge blocks located in the said slots under the said shoes, said wedge blocks having their outer faces inclined in correspondence to the inner faces of the said shoes, a cone slidable on the shaft adapted to force said wedge blocks outwardly, and means for retracting said shoes when the cone is withdrawn, said means including a pair of rings surrounding the said hub at opposite ends of the radial slots therein, pins carried by said rings passing through said diagonal slots in the shoes, and a spring acting upon said rings to move them around the said hub.

In testimony whereof I have signed my name to this specification this sixth day of May, 1918.

WM. FRITZ.